F. DECKER.
Clover Harvester.
No. 46,547.  Patented Feb. 28, 1865.
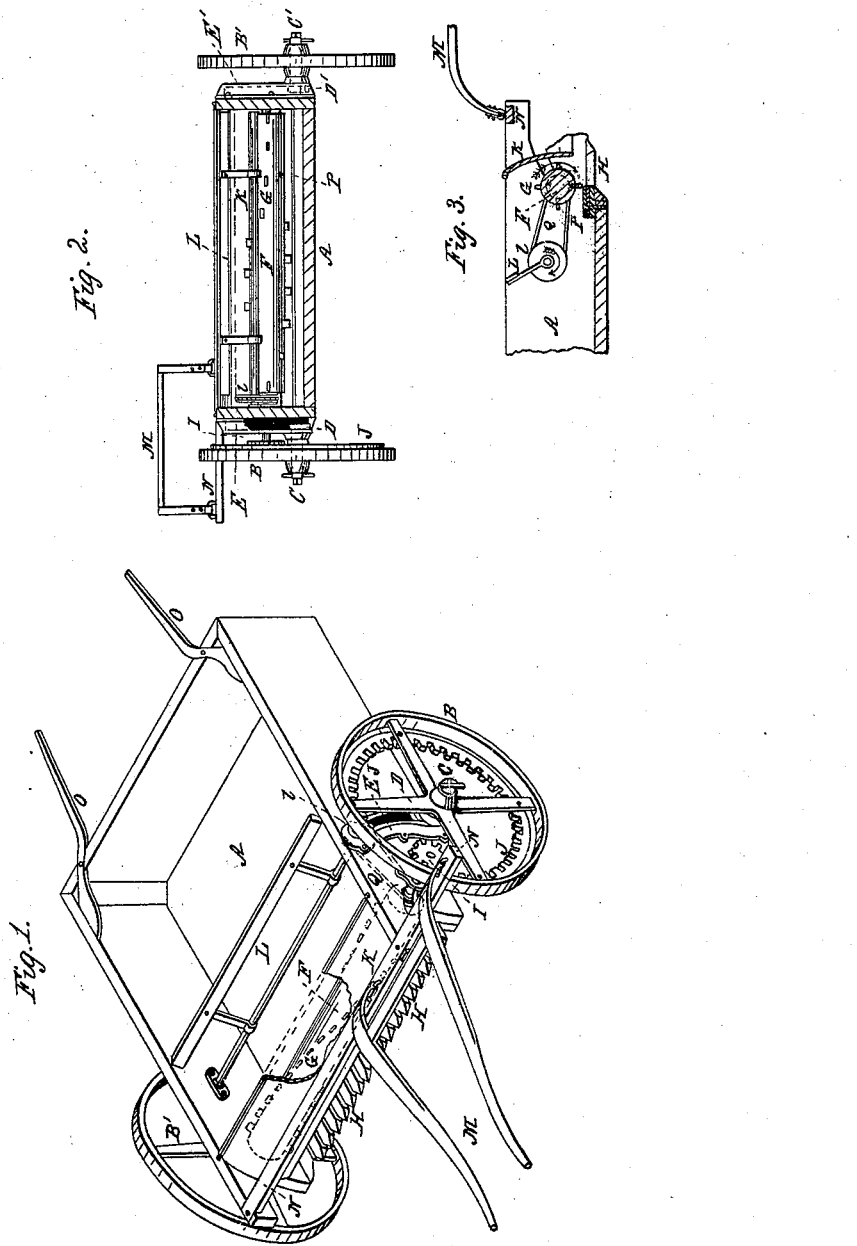

UNITED STATES PATENT OFFICE.

FREDERICK DECKER, OF OSTRANDER, OHIO.

IMPROVEMENT IN CLOVER-HARVESTERS.

Specification forming part of Letters Patent No. 46,547, dated February 28, 1865.

*To all whom it may concern:*

Be it known that I, FREDERICK DECKER, of Ostrander, Delaware county, Ohio, have invented new and useful Improvements in Clover-Harvesters; and I do hereby declare the following to be a full, clear, and exact description thereof, reference being had to the accompanying drawings, making part of this specification.

My improvements relate to the class of machines employed to separate and gather the ears or seed-bearing portions of clover, timothy, and other grasses (so called) in the field.

Figure 1 is a perspective view of a machine embodying my improvements. Fig. 2 is a transverse section thereof looking forward. Fig. 3 is a longitudinal section through the stripping mechanism.

The box A, which receives the heads, is upheld by ground-wheels B B', having two short axles, C C', which may be firmly secured at any height by means of screw-nuts D D', occupying slots E E' in the sides of the box. The slots E E' are concentric with the axis of the rotary stripper F, which is journaled horizontally in the sides of the box A, and is armed with blades G in two spiral rows, the blades of each row alternating in latitude with those of the other, so as to cover each other's intervals. The stripper F is so placed and adjusted as for its blades to work tangentially with a row of gathering-fingers, H, between which the stems of the grass or clover enter, and by which they are held and conducted to a transverse knife, P, with which the blades G act in conjunction, so as to clip or shear off the heads or ears of the crop.

The blades G may be arranged with their planes longitudinal of the stripper-head, as shown; or they may be arranged with the planes obliquely thereto, so as to have the advantage of a shear-cut.

The stripper F is driven by a positive motion by a pinion, I, on its shaft, which pinion meshes with an interior cog-wheel, J, on the near or left ground-wheel, B.

K is a curtain-board to prevent the escape of seeds and heads out of the machine by the centrifugal action of the stripper.

L is a reel to take the seeds and heads from the stripper and throw them backward into the box. The reel L is driven by a band, Q, which connects the stripper with a pulley, $l$, upon the reel-shaft.

M is a pair of shafts hinged to a shaft-bar, N, attached athwart the front of the box, the shafts being so situated as to bring the tug of the team directly in line with the center of resistance, and thus avoid all side draft, while the position of the shafts is also such as to compel the horse to walk on the stubble, and thus to avoid trampling upon the crop.

O are handles by which the machine is guided.

By temporarily loosening the screws D D' the box may be set at a greater or lesser height, according to the crop, without ungearing the stripper from the drive-wheel B, in consequence of the concentric form of the slots E E'. The spiral and alternating position of the blades G insures a continuous stripping action, free from jolts and choking.

I claim herein as new and of my invention—

The described combination of the knife P, fingers H, stripper F G, and reel L, all constructed and employed as and for the purposes specified.

In testimony of which invention I hereunto set my hand.

FREDERICK DECKER.

Witnesses:
GEO. H. KNIGHT,
W. P. REID.